(12) United States Patent
Kawauchi et al.

(10) Patent No.: US 8,229,668 B2
(45) Date of Patent: Jul. 24, 2012

(54) VEHICLE COMMUNICATION SYSTEM

(75) Inventors: Takashi Kawauchi, Yokohama (JP);
Takahiro Fujishiro, Yokohama (JP);
Yuki Horita, Tokyo (JP); Kazuya Monden, Yokohama (JP)

(73) Assignee: Renesas Electronics Corporation, Kanagawa (JP)

( * ) Notice: Subject to any disclaimer, the term of this patent is extended or adjusted under 35 U.S.C. 154(b) by 184 days.

(21) Appl. No.: 12/774,105

(22) Filed: May 5, 2010

(65) Prior Publication Data

US 2010/0286864 A1 Nov. 11, 2010

(30) Foreign Application Priority Data

May 7, 2009 (JP) ................................. 2009-112652

(51) Int. Cl.
*G01C 21/00* (2006.01)
(52) U.S. Cl. ........ 701/432; 701/414; 701/422; 701/423; 701/526
(58) Field of Classification Search .................. 701/414, 701/422, 423, 432, 526
See application file for complete search history.

(56) References Cited

U.S. PATENT DOCUMENTS

| | | | |
|---|---|---|---|
| 6,950,789 B2 * | 9/2005 | Laird et al. ......................... 703/8 |
| 7,295,925 B2 * | 11/2007 | Breed et al. .................... 701/301 |
| 7,663,533 B2 * | 2/2010 | Toennesen et al. .............. 342/70 |
| 7,925,413 B2 * | 4/2011 | Isaji et al. ........................ 701/93 |
| 2005/0240330 A1 * | 10/2005 | Heinrichs-Bartscher ....... 701/48 |
| 2008/0026758 A1 | 1/2008 | Murakami |
| 2008/0133136 A1 * | 6/2008 | Breed et al. .................... 701/301 |
| 2009/0216431 A1 * | 8/2009 | Vu et al. ......................... 701/201 |
| 2009/0289812 A1 * | 11/2009 | Kim et al. ...................... 340/905 |
| 2010/0082244 A1 * | 4/2010 | Yamaguchi et al. ........... 701/208 |
| 2010/0164753 A1 * | 7/2010 | Free ............................... 340/932 |
| 2010/0256904 A1 * | 10/2010 | Ishibashi et al. ............... 701/209 |
| 2011/0001634 A1 * | 1/2011 | Yokoyama et al. ............ 340/905 |
| 2011/0054783 A1 * | 3/2011 | Kishikawa et al. ............ 701/209 |

FOREIGN PATENT DOCUMENTS

| | | |
|---|---|---|
| EP | 1 883 191 A2 | 1/2008 |
| JP | 2006-25028 A | 1/2006 |
| JP | 2008-245268 A | 10/2008 |

* cited by examiner

*Primary Examiner* — Hussein A. Elchanti
(74) *Attorney, Agent, or Firm* — Mattingly & Malur, PC

(57) ABSTRACT

The present invention provides a vehicle communication system by which even when the number of other vehicles around a traffic line is increased, it is possible to prevent occurrence of a situation that there are located vehicles the number of which is larger than the capacity of a communicable network, and it is possible to secure communications with the other vehicles. Even when it is determined that a host vehicle enters in a traffic line and a plurality of other vehicles the number of which is larger than a threshold value are located in front and rear virtual regions of the host vehicle, a transmission power is reduced to the extent that communications between the host vehicle and one of the other vehicles that is located furthest in the virtual regions can be secured.

10 Claims, 8 Drawing Sheets

Fig.5

| VEHICLE ID | FIRST LATITUDE INFORMATION | SECOND LATITUDE INFORMATION | FIRST LONGITUDE INFORMATION | SECOND LONGITUDE INFORMATION | POSITIONING TIME | VEHICLE TRAVELLING DIRECTION | VEHICLE RUNNING VELOCITY (KM/H) |
|---|---|---|---|---|---|---|---|
| 1000 | 4807.038247 | N | 01131.324523 | E | 12:35:19.00 | 60 | 60 |

| VEHICLE ID 501 | FIRST LATITUDE INFORMATION 502 | SECOND LATITUDE INFORMATION 503 | FIRST LONGITUDE INFORMATION 504 | SECOND LONGITUDE INFORMATION 505 | VEHICLE RUNNING INFORMATION REGISTRATION TIME 506 | POSITIONING TIME 507 | VEHICLE TRAVELLING DIRECTION 508 | VEHICLE RUNNING VELOCITY (KM/H) 509 |
|---|---|---|---|---|---|---|---|---|
| 1000 | 4807.038247 | N | 01131.324523 | E | 12:35:19.01 | 12:35:19.00 | 60 | 60 |
| 1001 | 4807.038248 | N | 01131.324524 | E | 12:35:19.03 | 12:35:19.02 | 240 | 10 |

VEHICLE COMMUNICATION SYSTEM

CLAIM OF PRIORITY

The Present application claims priority from Japanese patent application JP 2009-112652 filed on May 7, 2009, the content of which is hereby incorporated by reference into this application.

BACKGROUND

The present invention relates to a vehicle communication system that is mounted in a vehicle to be used for communications with other vehicles, and also relates to a technique useful in application to, for example, prevention of vehicle collision.

For the purpose of safe-driving support and efficiency of road traffic, an intelligent transport system (ITS) has been widely spread. As one of safe-driving system services, there has been studied a service in which vehicle communication systems mounted in running vehicles which are adjacent to each other perform wireless communications with each other to provide running states of the host vehicles, so that their drivers receive a warning of avoidance of collision accident in traffic. In an inter-vehicle communication network comprised of such vehicle communication systems, communications are performed by autonomously forming network without base stations, unlike a network system that is used for mobile phones and is controlled by base stations. In the inter-vehicle communication network, the vehicle communication system of each vehicle exchanges vehicle running information showing a running state of each vehicle such as the position, velocity, and moving direction of each host vehicle with those of the other vehicles, together with the IDs of the respective vehicles. The vehicle running information is converted into a packet that is a set of information to be transmitted from an antenna as a transmission signal.

A reachable range of the transmission signal corresponds to a communication range of the vehicle communication system. Transmission to all vehicles in the transmission range by the vehicle communication system is called as broadcasting. Since the broadcasting is performed using only the same wireless channel, the running state can be received from the other vehicles in the communication range among the adjacent vehicles in the communication range, and a safe-driving support service is provided using the information.

When performing the inter-vehicle communications, a wireless channel is shared among a plurality of vehicle communication systems. Thus, only one vehicle communication system can transmit information in the transmission range, and the other vehicle communication systems can only receive the information. Therefore, when a plurality of communications systems perform communications at the same time, a signal collision phenomenon that is called as wireless collision occurs, resulting in failure of communications due to damage of a packet during transmission.

For the purpose of providing a safe-driving support service, the inter-vehicle communications are performed. Accordingly, it is important to perform communications without any trouble even when a plurality of vehicles are located in a communication range. The communication range of a host vehicle is herein defined as a host-vehicle network. The maximum capacity number N of vehicles which can be accommodated in the host-vehicle network is obtained as follows.

In the first place, when a transmission time Ts of data is obtained, a packet transmission time $Ts0=Dx/Vx$ can be obtained from a transmission period Td of data, a transmission velocity Vx of data, and a data amount Dx communicated in a transmission range. Further, in a wireless collision avoidance technique called CSMA/CA (Carrier-Sense Multiple Access with Collision Avoidance) in which when starting communications, data are transmitted after conforming that other communication systems do not perform communications, a sum Ts1 of a time required for confirming that the wireless channel is not used and a time required for switching transmission and reception is obtained. The transmission time of data is obtained as $Ts=Ts0+Ts1$. Accordingly, the maximum number of vehicles which can be accommodated in the host-vehicle network within the communication range is obtained as $N=Td/Ts$. For example, if $Ts0=0.01024$ ms and $Ts1=1$ ms obtained from $Td=50$ ms, $Dx=1024$ bits (packet volume of 128×8 bits), and $Vx=1$ Mbps, the maximum capacity number N of vehicles is 49.

For example, when a vehicle is stuck in traffic, there are located vehicles the number of which is larger than the maximum capacity number, resulting in difficulty of inter-vehicle communications in the communication range of the network.

Therefore, it has been studied that wireless collision is reduced by changing a transmission power and a transmission period. The transmission power herein means an output voltage value set in an inter-vehicle wireless system. The transmission period is a transmission period of a packet transmitted by a vehicle communication system.

A long transmission period of packets reduces the transmission frequency of packets in each communication system, and thus reduction of wireless collision can be advantageously expected. Further, when the transmission power is reduced, the communication range is narrowed and the number of vehicles in the communication range is reduced. Thus, reduction of wireless collision can be advantageously expected. However, if the transmission period is too long for the purpose of safe-driving support such as collision avoidance, there is a problem that the vehicle running information necessary for collision prevention does not reach. For example, in comparison between transmission periods of 1 second and 0.1 second in which the vehicle running information is transmitted, a vehicle running at a velocity of 60 km/h advances 16.6 m per second, and 1.6 m per 0.1 second. Thus, vehicle positional information that can be periodically obtained in accordance with a predetermined period can be obtained every 16.6 m and 1.6 m, which makes a significant difference in accuracy to avoid collision by obtaining the positions of the other vehicles. Further, if the transmission range is needlessly narrowed, a communication range necessary for traffic safety support cannot be secured, and the vehicle running information of other vehicles located out of a range where a collision accident avoidance service in traffic can be provided does not reach.

For example, in Japanese Patent Laid-Open No. 2008-245268, a wireless communication device mounted in a vehicle incorporates therein a microcomputer to which a running velocity V is input in order to address the problems of the transmission power and the transmission period. The microcomputer calculates a transmission period Td that becomes shorter as the running velocity V becomes higher, and a communication output that becomes larger as the running velocity becomes higher, and transmits information relating to the vehicle such as a running state at the transmission period Td. Therefore, necessary communications can be secured and communication traffic can be reduced.

SUMMARY

In the case where a transmission power is controlled at the velocity of the host vehicle described in Japanese Patent Laid-Open No. 2008-245268, each of vehicle communication systems mounted in vehicles forming a traffic line running at low velocities due to a traffic jam reduces the transmission power. Due to the reduction of the communication range of each of the vehicles forming a traffic line running at low velocities, the vehicle running information of the vehicles forming a traffic line does not reach a vehicle approaching from outside of the communication range of the vehicle, namely, outside of the traffic line. Thus, a problem occurs in providing a safe-driving support service for prevention of collision avoidance in traffic.

The present invention provides a vehicle communication system by which even when the number of other vehicles around a traffic line is increased, it is possible to prevent occurrence of a situation that there are located vehicles the number of which is larger than the capacity of a communicable network, it is possible to secure communications with the other vehicles, and it is possible to provide a high-quality safe-driving support service for prevention of collision accident in traffic.

The above and other objects and novel features of the present invention will become apparent from the description and the accompanying drawings of the present specification.

The followings are summarized descriptions of representative aspects of the present invention disclosed in this application.

Specifically, even when it is determined that a host vehicle enters in a traffic line and a plurality of other vehicles the number of which is larger than a threshold value are located in front and rear virtual regions of the host vehicle, a transmission power is reduced to the extent that communications between the host vehicle and one of the other vehicles that is located furthest in the virtual regions can be secured. Accordingly, even when the number of the other vehicles around a traffic line is increased, the transmission range is narrowed to decrease the number of vehicles entering into the range, so that it is possible to prevent occurrence of a situation that there are located vehicles the number of which is larger than the capacity of a network which enables wireless communication collision avoidance. In addition, even if the transmission power is reduced, the transmission power at which communications between the host vehicle and one of other vehicles that is located furthest in the virtual regions can be secured is maintained. Thus, there is no possibility that driving support for vehicles cannot be performed due to inability of communications with the other vehicles. The respective vehicles located in a traffic line control their communication intensities using the same protocol as described above, so that it is possible to provide a high-quality safe-driving support service for prevention of collision accident in traffic.

The followings are summarized effects obtained from the representative aspects of the present invention disclosed in this application.

Specifically, even when the number of other vehicles around a traffic line is increased, it is possible to prevent occurrence of a situation that there are located vehicles the number of which is larger than the capacity of a communicable network, it is possible to secure communications with the other vehicles, and it is possible to provide a high-quality safe-driving support service for prevention of collision accident in traffic.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 5 is an explanation diagram for illustrating vehicle running information contained in a transmission packet;

FIG. 6 is an explanation diagram for illustrating information stored in a vehicle DB;

DETAILED DESCRIPTION OF THE EMBODIMENTS

1. Summary of the Preferred Embodiments

Figure 1:
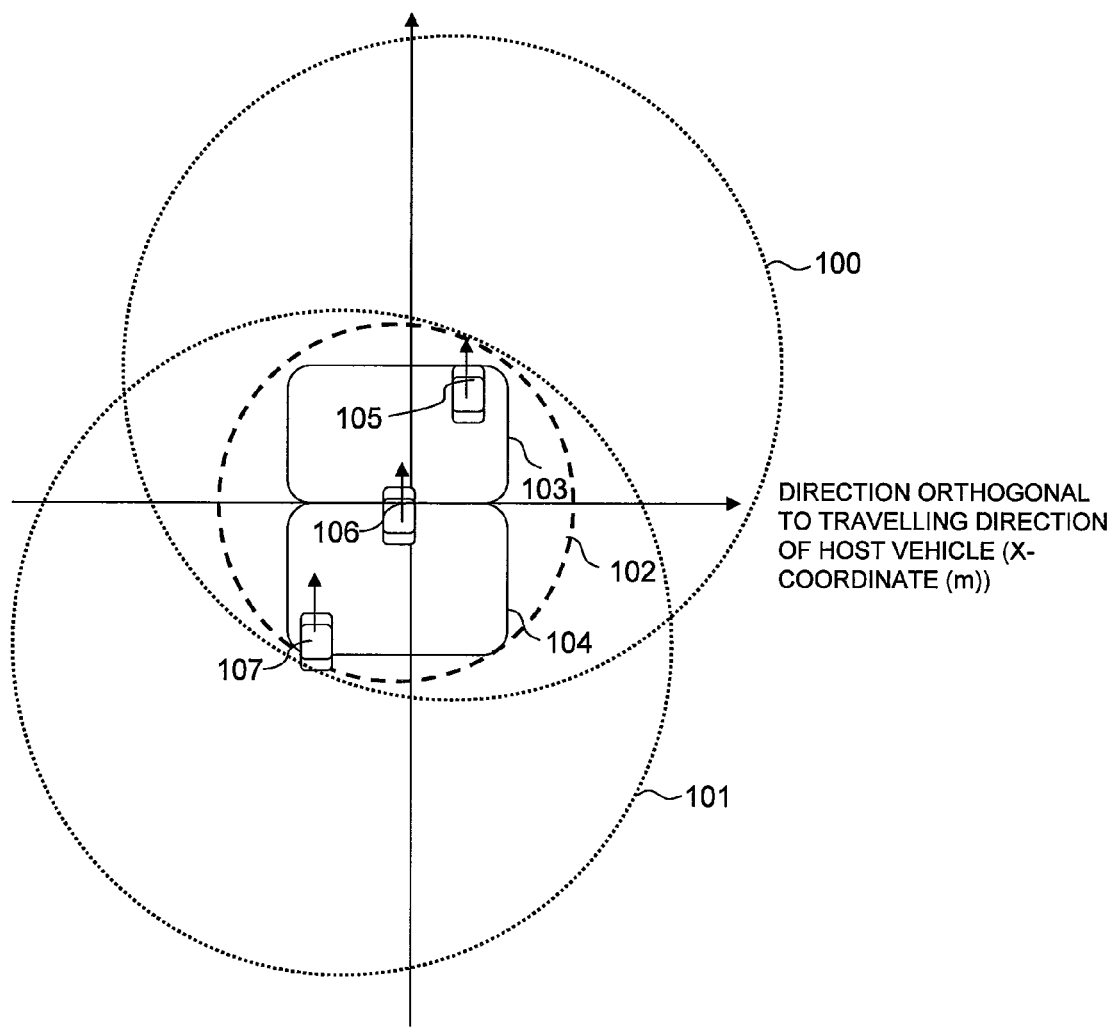
FIG. 1 is an explanation diagram for illustrating the principle of transmission power control according to the present invention.

In the first place, general outlines of representative embodiments of the present invention disclosed in this application will be described. The reference numerals in the drawings to be referred to while being in parentheses in the description of the general outlines of the representative embodiments merely illustrate constitutional elements within the concepts of those which are given the reference numerals.

[1] A vehicle communication system (200) according to an embodiment of the present invention comprises: a host-vehicle information generating unit (311) which generates running information of a host vehicle; a communication processing unit (301) which transmits the running information of the host vehicle generated by the host-vehicle information generating unit in wireless communications and receives running information of other vehicles in wireless communications; a virtual region defining unit (312) which defines virtual regions around the travelling direction of the host vehicle on the basis of the generated running information of the host vehicle; a traffic line determination unit (307) which determines whether or not there are located the other vehicles the number of which is larger than a threshold value in front and rear regions in the running direction of the host vehicle among the defined virtual regions, on the basis of the received running information of the other vehicles and the generated running information of the host vehicle; and a transmission controlling unit (308) which maintains a first transmission power when it is determined by the traffic line determination unit that the number of the other vehicles is smaller than the threshold value, and which controls to reduce the transmission power in wireless communications to a second transmission power lower than the first transmission power when it is determined by the traffic line determination unit that the number of the other vehicles is larger than the threshold value.

According to the embodiment, even when it is determined that a host vehicle enters in a traffic line and a plurality of other vehicles the number of which is larger than a threshold value are located in front and rear virtual regions of the host vehicle, a transmission power is reduced to the extent that communications between the host vehicle and one of the other vehicles that is located furthest in the virtual regions can be secured. Accordingly, even when the number of the other vehicles around a traffic line is increased, the transmission range is narrowed to decrease the number of vehicles entering into the range, so that it is possible to prevent occurrence of a situation that there are located vehicles the number of which is larger than the capacity of a network which enables wireless communication collision avoidance. In addition, even if the transmission power is reduced, the transmission power at which communications between the host vehicle and one of other vehicles that is located furthest in the virtual regions can be secured is maintained. Thus, there is no possibility that driving support for vehicles cannot be performed due to inability of communications with the other vehicles. The respective vehicles located in a traffic line control their communication intensities using the same method as described above, so that it is possible to provide a high-quality safe-driving support service for prevention of collision accident in traffic.

[2] In the vehicle communication system according to the paragraph [1], the host-vehicle information generating unit inputs thereinto an output of a sensor, and generates the position of the host vehicle, the running velocity of the host vehicle, and the travelling direction of the host vehicle as the running information.

[3] In the vehicle communication system according to the paragraph [1] or [2], the communication processing unit uses a communication protocol in accordance with carrier sense multiple access.

[4] In the vehicle communication system according to any one of the paragraphs [1] to [3], the communication processing unit receives the IDs of the other vehicles, the positions of the other vehicles, the running velocities of the other vehicles, and the travelling directions of the other vehicles as the running information of the other vehicles.

[5] In the vehicle communication system according to the paragraph [4], a database (310) in which the running information of the other vehicles received by the communication processing unit is accumulated using the IDs of the other vehicles as indexes in a rewritable manner is further provide, and the traffic line determination unit uses the running information of the other vehicles accumulated in the database.

[6] In the vehicle communication system according to any one of the paragraphs [1] to [5], the virtual regions defined by the virtual region defining unit include a front region and a rear region which are divided at the position of the host vehicle.

[7] In the vehicle communication system according to any one of the paragraphs [1] to [6], as the velocity of the host vehicle is increased, the virtual region defining unit defines the virtual regions larger. If the velocity of the host vehicle is high, the virtual regions are enlarged to control the transmission power, and if the velocity of the host vehicle is low, the virtual regions are narrowed to control the transmission power. Accordingly, the present invention is suitable for providing a safe-driving support service for prevention of collision accident in traffic in consideration of the velocity of the vehicle.

[8] In the vehicle communication system according to any one of the paragraphs [1] to [7], when it is determined by the traffic line determination unit that the number of the other vehicles is larger than the threshold value, the transmission controlling unit determines a transmission power on the basis of a distance of one of the other vehicles that is located furthest in the virtually-defined regions as a parameter.

[9] In the vehicle communication system according to any one of the paragraphs [1] to [8], when it is determined by the traffic line determination unit that the number of the other vehicles is larger than the threshold value, and when a confirmation packet is transmitted to one of the other vehicles that is located furthest from the host vehicle while gradually increasing the transmission power from the lowest level when it is determined by the traffic line determination unit that the number of the other vehicles is larger than the threshold value, and a reply for the transmission arrives, the transmission controlling unit sets the transmission power as the second transmission power.

[10] A vehicle communication system according to another embodiment of the present invention comprises: a host-vehicle information generating unit which generates running information of a host vehicle; a communication processing unit which transmits the running information of the host vehicle generated by the host-vehicle information generating unit in wireless communications and receives running information of other vehicles in wireless communications; a database in which the running information of the other vehicles received by the communication processing unit is accumulated; a virtual region defining unit which defines virtual regions around the travelling direction of the host vehicle on the basis of the generated running information of the host vehicle; a traffic line determination unit which determines whether or not there are located the other vehicles the number of which is larger than a threshold value in front and rear regions in the running direction of the host vehicle among the defined virtual regions, on the basis of the running information of the other vehicles accumulated in the database and the generated running information of the host vehicle; and a transmission controlling unit which controls, when it is determined by the traffic line determination unit that the number of the other vehicles is larger than the threshold value, to narrow a transmission range in wireless communications as compared to a case that the number of the other vehicles is smaller than the threshold value.

2. Further Detailed Description of the Preferred Embodiments

The embodiment will be further described in more detail.

FIG. 1 illustrates the principle of transmission power control according to the present invention. Each of vehicles 105, 106, and 107 measures running information such as its position, velocity, moving direction, and the like, and periodically transmits the running information to other vehicles located in a transmission range. The reference numerals 100 and 101 denote transmission ranges of the host vehicles which run without recognizing that they are in a traffic line. In the drawing, the transmission range 100 is the transmission range of the vehicle 105, and the transmission range 101 is the transmission range of the vehicle 107. Each host vehicle determines whether or not there are located the other vehicles in predetermined regions (virtual regions) which are virtually set in front and rear of each host vehicle. For example, the vehicle 106 determines whether or not there are located the other vehicles the number of which is larger than a threshold value in virtual regions 103 and 104 set in front and rear of the vehicle 106. Specifically, the vehicle 106 determines whether or not it is located in a traffic line. When it is determined that there are located the other vehicles the number of which is larger than the threshold value in the respective regions, a transmission power is reduced as compared to before the determination, so that the transmission range is narrowed as indicated by the reference numeral 102. A moderate number equal to 1 or larger is set for the threshold value in consideration of an error and the like. The running information is periodically transmitted while performing, for example, WAVE (Wireless Access Vehicular Environment) communications compliant with IEEE802.11p, and a protocol called CSMA/CA (Carrier Sense Multiple Access/Collision Avoidance) designed for wireless communication collision avoidance is employed in the communications. A plurality of other vehicles are located in front and rear of a vehicle in a traffic line. If the transmission range is narrowed in accordance with the number of other vehicles, the number of vehicles entering into the range can be reduced. Thus, it is possible to prevent occurrence of a situation that there are located the other vehicles the number of which is larger than the capacity of a network which enables the wireless communication collision avoidance using a protocol such as CSMA/CA.

Figure 2:
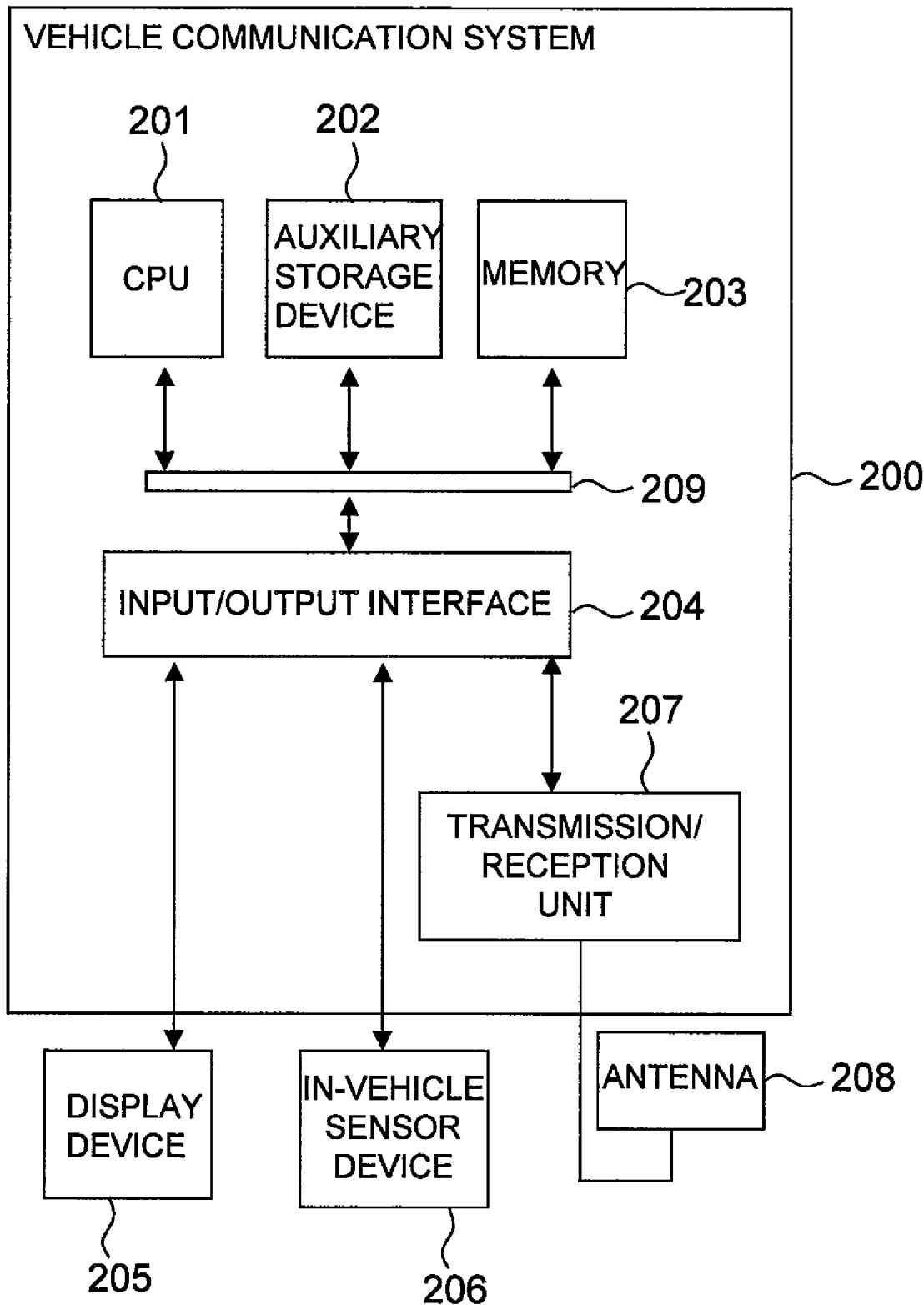
FIG. 2 is a block diagram for showing a hardware configuration of a vehicle communication system which employs the transmission power control.

FIG. 2 illustrates a hardware configuration of a vehicle communication system which employs the transmission power control. As shown in FIG. 2, a vehicle communication system 200 includes a CPU (Central Processing Unit) 201, a memory 203 such as a RAM used for a work region of the CPU 201, an auxiliary storage device 202 such as a file memory device or a hard disk device, an input/output interface 204, a bus 209, and a transmission/reception unit 207. An antenna 208 is coupled to the transmission/reception unit 207. A display device 205 and an in-vehicle sensor device 206 are coupled to the input/output interface 204. For example, the vehicle communication system 200 may be configured as a single or multi semiconductor chip. In the case where data processors for an ECU or a car navigation system are used as the CPU 201, the auxiliary storage device 202, and the memory 203, the input/output interface 204 and the transmission/reception unit 207 may be configured using another semiconductor integrated circuit.

Figure 3:
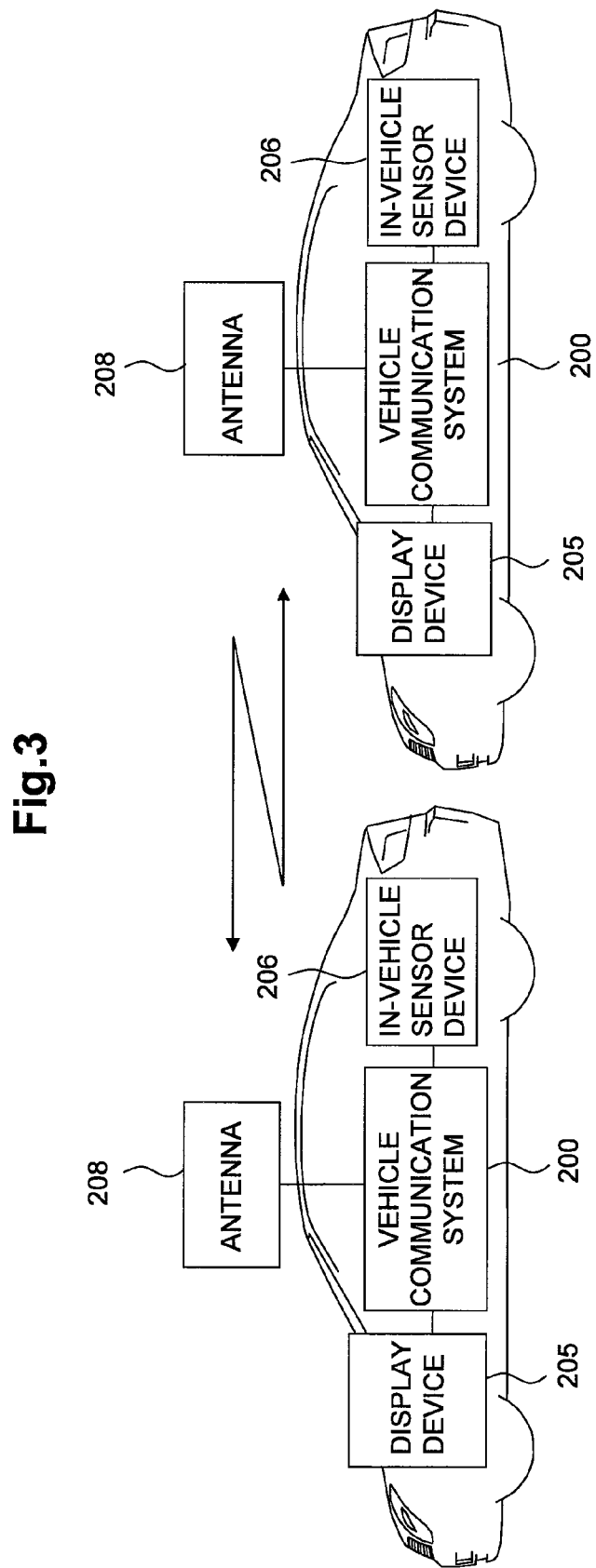
FIG. 3 is an outlined explanation diagram for illustrating vehicles in which the vehicle communication systems are mounted.

The vehicle communication system 200 is mounted in a vehicle for use. In FIG. 3 illustrating vehicles in which the vehicle communication systems 200 are mounted, each of vehicles 209 and 210 illustrated includes the display device 205, the vehicle communication system 200, the in-vehicle sensor device 206, and the antenna 208. The vehicle communication system 200 mounted in the vehicle 209 performs communications with another mounted in the vehicle 210 via the antenna 208.

The in-vehicle sensor device 206 serves as a sensor in a navigation system of a vehicle or a sensor in a vehicle. The sensor may include a global positioning system (GPS), a gyroscope, a compass, a gyrocompass, and a velocity sensor. The GPS measures a time, and the latitude and longitude of the vehicle. The gyroscope measures the acceleration and angle of the vehicle. The compass and gyrocompass measure the moving direction of the vehicle. The velocity sensor measures the velocity of the vehicle.

In the auxiliary storage device 202, setting information such as operation programs of the CPU and various parameters is stored. The memory 203 is used as a work region when the CPU executes the operation programs or as a primary storage region of data or programs. For example, the auxiliary storage device 202 is used as a region for storing a program which defines variables and arrays and a program which determines a transmission powertransmission power from the host vehicle. The memory 203 temporarily stores arrays for setting other-vehicles running information and the running information relating to the host vehicle as variables and arrays. The CPU 201 performs the programs to realize data processing by functional units to be described later.

The antenna 208 is used in both of transmission and reception. In the case where a transmission signal is output from the antenna 208, the transmission/reception unit 207 switches the antenna 208 to a transmission mode. In the case where a transmission signal is not output from the antenna 208, the transmission/reception unit 207 switches the antenna 208 to a reception mode.

Figure 4:
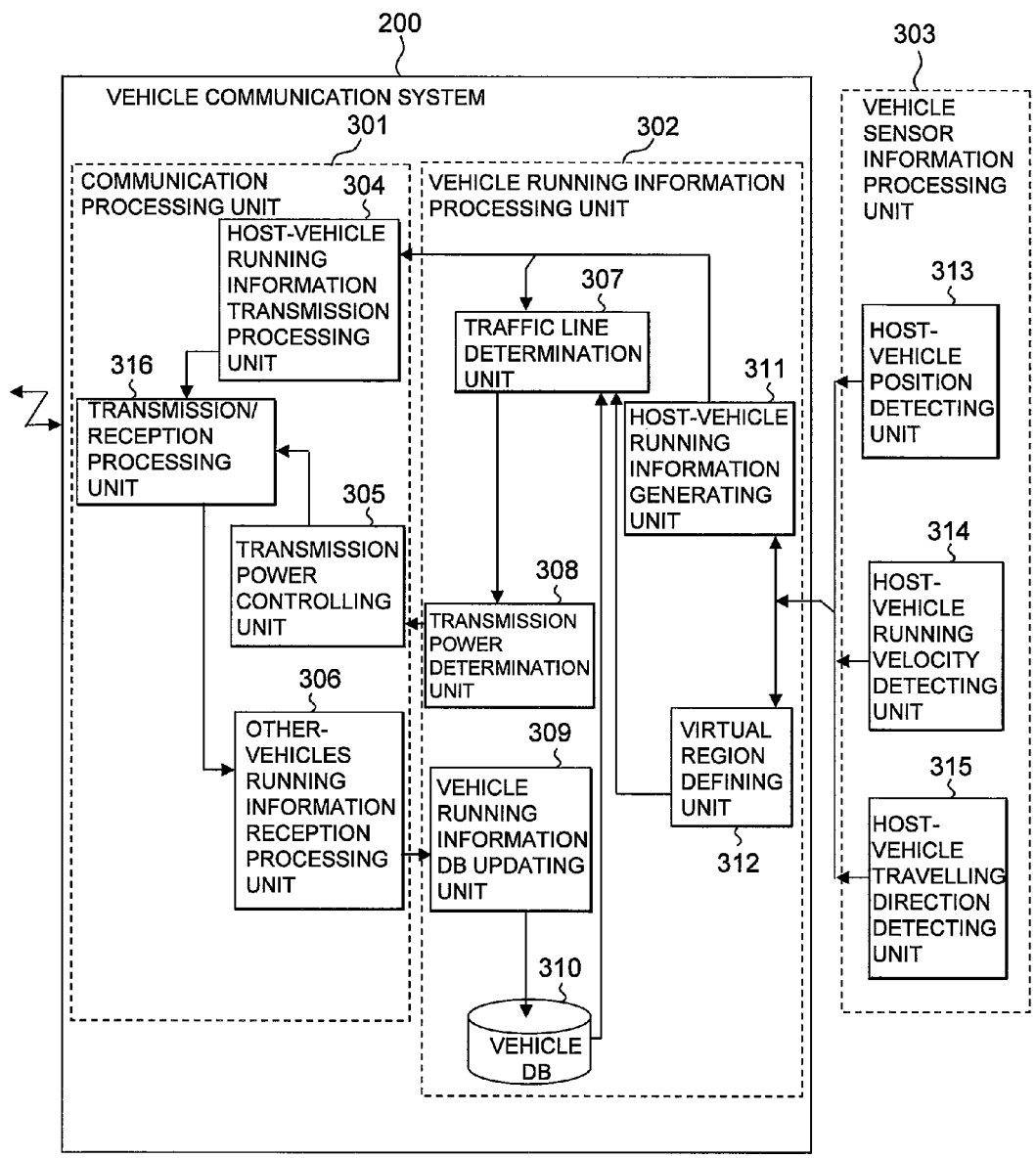
FIG. 4 is a functional block diagram of the vehicle communication system realized by the hardware shown in FIG. 2.

FIG. 4 illustrates a functional block diagram of the vehicle communication system 200 realized by the hardware shown in FIG. 2. The vehicle communication system 200 includes a communication processing unit 301 and a vehicle running information processing unit 302. An external vehicle sensor information processing unit 303 is coupled to the vehicle running information processing unit 302.

The communication processing unit 301 includes a transmission/reception processing unit 316, a host-vehicle running information transmission processing unit 304, a transmission power controlling unit 305, and an other-vehicles running information reception processing unit 306. The vehicle running information processing unit 302 includes a traffic line determination unit 307, a transmission power determination unit 308, a vehicle running information database updating unit 309, a vehicle database (database is simply referred to as DB) 310, a host-vehicle running information generating unit 311, and a virtual region defining unit 312. The vehicle sensor information processing unit 303 includes a host-vehicle position detecting unit 313, a host-vehicle running velocity detecting unit 314, and a host-vehicle travelling direction detecting unit 315.

The transmission/reception processing unit 316 transmits packets in accordance with a transmission power set by the transmission power controlling unit 305, and receives packets transmitted from the in-vehicle communication systems of the other vehicles. The vehicle running information is stored in each of the transmitted packet. As shown in FIG. 5, each packet includes information showing a vehicle ID 401, a first latitude information 402 showing a latitude, a second latitude information 403 showing a north latitude (N) or a south latitude (S), a first longitude information 404 showing a longitude, a second longitude information 405 showing an east longitude (E) or a west longitude (W), a positioning time 406 of positional information, a vehicle travelling direction 407, and a vehicle running velocity 408. In the vehicle ID 401, the ID of the in-vehicle communication system, for example, the identification number unique to the communication system or "1000" as the identification number that is randomly assigned when the vehicle communication system is started is stored. In the first latitude information 402, latitude information obtained from the GPS sensor, for example, latitude information "4807.038247" extracted from Global Positioning System Fix Data in an NMEA-0183 format received by the GPS is stored. In the second latitude information 403, a north latitude or a south latitude of the latitude information 402 is stored. For example, if the vehicle is located at a north latitude, N is stored, and if the vehicle is located at a south latitude, S is stored. In the positioning time 406, the positioning time of the latitude information 402 and the latitude information 403 obtained from the GPS is stored. In the vehicle travelling direction 407, an azimuth is stored. In the vehicle velocity 408, the running velocity of the vehicle obtained from the velocity sensor is stored. For example, if the vehicle is running at a velocity of 60 km, 60 is stored. The vehicle running information illustrated in FIG. 5 configures a data portion of a transmission/reception packet. The transmission/reception packet is in a packet format including, but not limited to, a preamble at the beginning and if needed, a header such as MAC (Media Access Control address) followed by the data portion.

The other-vehicles running information reception processing unit 306 accepts the packet which is transmitted from the in-vehicle communication system of each of the other vehicles and is received by the transmission/reception processing unit 316. The other-vehicles running information reception processing unit 306 reads, as the vehicle running information included in the received packet, the vehicle ID 401, the first latitude information 402, the second latitude information 403 (a north latitude or a south latitude), the first longitude information 404, the second longitude information 405 (an east longitude or a west longitude), the positioning time 406 of the positional information, the vehicle travelling direction 407, and the vehicle running velocity 408.

The vehicle running information DB updating unit 309 adds a registration time of the database to the vehicle running information extracted from the received packet by the other-vehicles running information reception processing unit 306, and controls to store the information of the other vehicles into the vehicle DB 310. If the same vehicle ID information is already present in the vehicle DB 310 when registering the vehicle running information, the vehicle running information DB updating unit 309 overwrites the vehicle ID information. In addition, when a predetermined time elapses, the vehicle running information DB updating unit 309 periodically deletes the vehicle running information in the database in accordance with a predetermined period.

FIG. 6 illustrates information stored in the vehicle DB 310. The vehicle ID such as the identification number unique to the communication system or the identification number that is randomly assigned when the vehicle communication system is started is stored in 501. The first latitude information, the second latitude information (a north latitude or a south latitude), the first longitude information, the second longitude information (an east longitude or a west longitude), the vehicle running information registration time, the positioning time of the positional information, the vehicle travelling direction, the vehicle running velocity are stored in 502, 503, 504, 505, 506, 507, 508, and 509, respectively. In a line 511, information relating to the vehicle ID "1000" is stored as one database entry. In a line 512, information relating to the vehicle ID "1001" is stored as another database entry. For example, each database entry is managed using the vehicle ID as an index.

The host-vehicle running information generating unit 311 obtains the running information of the host vehicle to generate a host-vehicle running information packet. Specifically, the host-vehicle running information generating unit 311 periodically generates a transmission packet storing the host-vehicle running information including the host vehicle position detected by the host-vehicle position detecting unit 313, the running velocity detected by the host-vehicle running velocity detecting unit 314, and the vehicle moving direction detected by the host-vehicle travelling direction detecting unit 315 in accordance with a predetermined period. The running information of the host vehicle is periodically transmitted to the other vehicles in accordance with a predetermined period. The running information of the host vehicle includes information showing: the vehicle ID 401; and the first latitude information 402, the second latitude information 403 (a north latitude or a south latitude), the first longitude information 404, and the second longitude information 405 (an east longitude or a west longitude) detected by the host-vehicle position detecting unit 313 from the GPS and the like as shown in FIG. 5. The vehicle running information further includes information showing the positioning time 406 of the positional information, the vehicle travelling direction 407 detected by the host-vehicle travelling direction detecting unit 315 from the compass or the gyrocompass, and the vehicle velocity 408 detected by the host-vehicle running velocity detecting unit 314 from the velocity sensor. The host-vehicle running information is used for generating the virtual regions and calculating distances from the other vehicles. In short, the host-vehicle running information is used for generating the virtual regions and calculating distances from the other vehicles. Further, the packet generated by the host-vehicle running information generating unit 311 is passed on to the host-vehicle running information transmission processing unit 304, and then is periodically passed on to the transmission/reception processing unit 316 for a transmission process in accordance with a predetermined period. The host-vehicle running information generating unit 311 stores, into a transmission packet, the following information of FIG. 5: the first latitude information 402, the second latitude information 403, the first longitude information 404, the second longitude information 405, and the positioning time 406 detected by the host-vehicle position detecting unit 313 from the GPS and the like; the vehicle travelling direction 407 detected by the host-vehicle travelling direction detecting unit 315 from the compass or the gyrocompass; and the vehicle velocity 408 detected by the host-vehicle running velocity detecting unit 314 from the velocity sensor.

Figure 7:
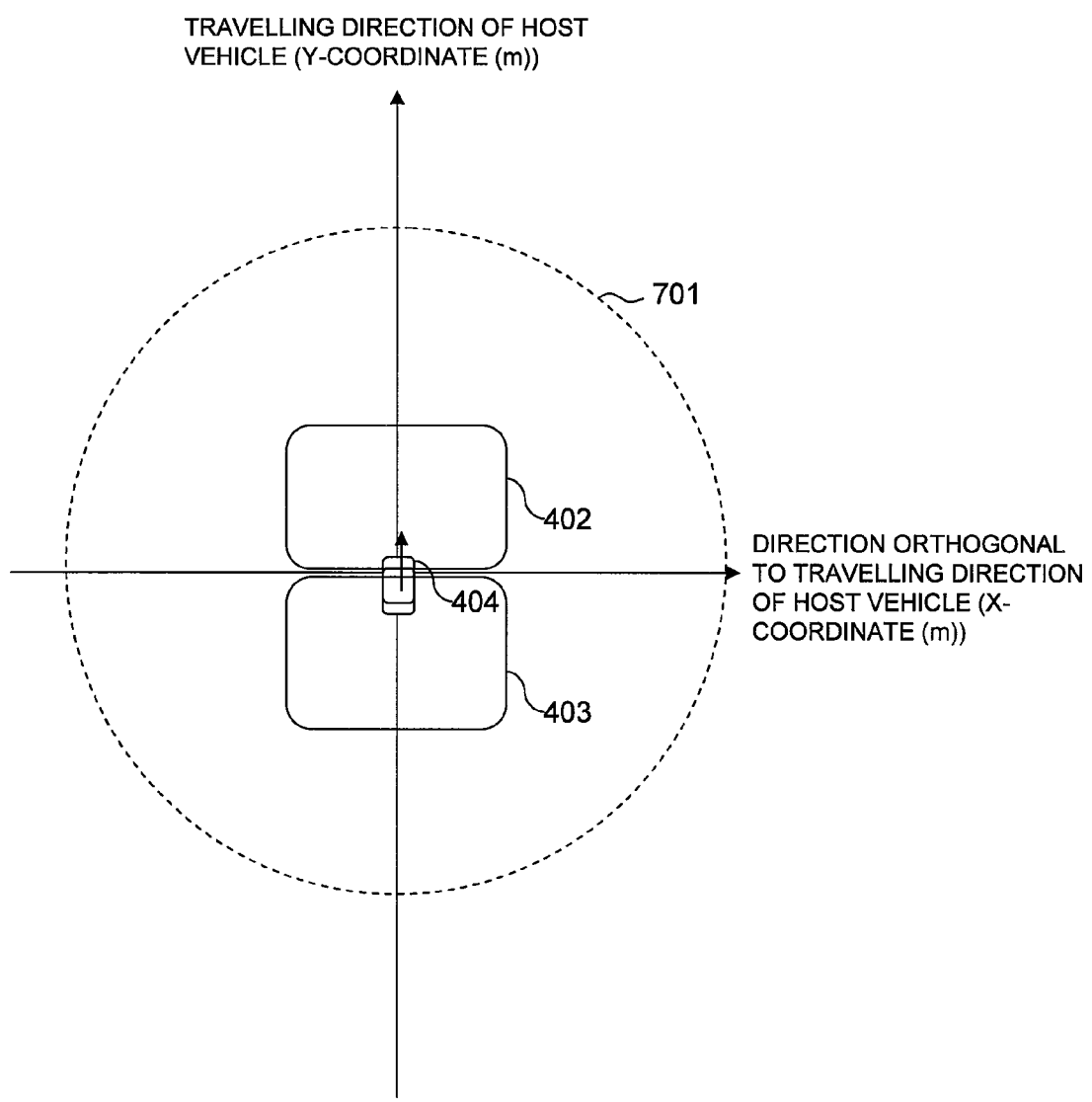
FIG. 7 is an explanation diagram of virtual regions defined by a virtual region defining unit.

The virtual region defining unit 312 defines virtual regions necessary for transmitting or receiving the packet to/from the in-vehicle communication system of each of the other vehicles. In FIG. 7, the virtual regions will be described. The virtual region defining unit 312 generates a front virtual region 702 and a rear virtual region 703 around a host vehicle 704 with a communication range 701. The front virtual region 702 and the rear virtual region 703 are collectively referred to as virtual regions. On the assumption that while the position of the host vehicle is set as an original position based on the generated host-vehicle running information, the travelling direction of the host vehicle is represented as a Y-axis and the direction orthogonal to the travelling direction of the host vehicle is represented as an X-axis, the virtual region defining unit 312 sets the front virtual region 702 in a range of, for example, 0 to 50 m on the Y-axis and −15 to 15 m on the X-axis, and sets the rear virtual region 703 in a range of, for example, 0 to 50 m on the Y-axis and −15 to 15 m on the X-axis. The set regions are converted into latitudes and longitudes, and information showing the equation of a straight line representing a boundary of the regions is stored into the memory. The defining method of the virtual regions described herein is an example. If the velocity of the host vehicle is increased, the size of each of the virtual regions may be enlarged in accordance with the velocity of the host vehicle. Further, the shape of each of the virtual regions is not limited to a rectangular shape, but may include other shapes such as a circular shape.

In the case where there are located the other vehicles the number of which is larger than a threshold value in the front virtual region and the rear virtual region, the traffic line determination unit 307 determines that the host vehicle is located in a traffic line. For example, in the case where there are located the other vehicles running in the same moving direction as the host vehicle in the front virtual region 702 and the rear virtual region 703 generated by the virtual region defining unit, the number of the other vehicles is counted. For example, the followings are methods of determining whether or not the moving direction of the host vehicle is the same as those of the other vehicles. For example, in the case where the moving directions of the other vehicles are within a range of a value obtained by adding or subtracting a predetermined value to/from the travelling direction of the host vehicle, the moving direction of the vehicle is regarded as the same as those of the other vehicles. In the case where the determination process is simplified, all of the other vehicles located in the virtual regions are regarded as running in the same direction as the host vehicle. In addition, by using road data of a navigation, it is determined whether or not the other vehicles are running in the same direction as the vehicle. On the basis of the number of the other vehicles, it is determined whether or not the host vehicle is located in a traffic line. For example, in the case where the number of the other vehicles is larger than a threshold value "Number vehicle" of the number of vehicles in the virtual regions, it is determined that the other vehicles are located in the virtual regions. For example, on the assumption of "Number vehicle"=1, when two or more other vehicles are located in the front virtual region and two or more other vehicles are located in the rear virtual region, the traffic line determination unit determines that the host vehicle is located in a traffic line.

On the basis of the determination result of the traffic line determination unit 307, the transmission power determination unit 308 sets a range around the host vehicle where a transmission signal from the host vehicle can be reached, and transmits transmission power value information to the transmission power controlling unit 305. The transmission power value information is, for example, an output voltage value (transmission power). In the case where the host vehicle is located in a traffic line, the transmission power determination unit 308 sets the transmission power, so that the transmission signal can be reached to the host vehicle in the front and rear virtual regions and the other vehicles in the virtual regions of the host vehicle. The transmission power determination unit 308 obtains a distance from one of the other vehicles that is located furthest in the virtual regions to the host vehicle. The traffic line determination unit 308 obtains distances between the host vehicle and all of the other vehicles located in the virtual regions using, for example, a geodesic sailing method such as a Lambert-Andoyer method on the basis of the first latitude information 402, the second latitude information 403, the first longitude information 404, the second longitude information 405 of the running information of the host vehicle and the other vehicles located in the virtual regions. In addition, the traffic line determination unit 308 determines one of the other vehicles that is located furthest from the vehicle. For example, a method of obtaining a distance between two points in the Lambert-Andoyer method is performed in accordance with the following scheme. On the assumption that the position of the host vehicle (the geodetic longitude of the host vehicle and the geodetic latitude of the host vehicle) is represented as a point A (lA and LA) and the position of one of the other vehicles (the geodetic longitude of one of the other vehicles and the geodetic latitude of one of the other vehicles) is represented as a point B (lB and LB), a distance (geodesic length) ρ between the point A and the point B is obtained as follows.

1. The geodetic latitude is converted into a reduced latitude using an equation of $\phi=\tan^{-1}(B/A \cdot \tan l)$ wherein A represents the equatorial radius of the earth, B represents the polar radius of the earth, l represents a geodetic latitude, and φ represents the converted reduced-latitude.
2. A distance X on a spherical surface is obtained from an equation of $X=\cos^{-1}[\sin \phi A \cdot \sin \phi B + \cos \phi A \cdot \cos \phi B \cdot \cos(LA-LB)]$ wherein φA represents the reduced latitude of the point A and φB represents the reduced latitude of the point B.
3. Δρ is obtained by the Lambert-Andoyer method using an equation of $\Delta\rho=F/8 \ast \{(\sin X - X) \ast (\sin \phi A + \sin \phi B)2/\cos 2(X/2) - (\sin X + X) \ast (\sin \phi A - \sin \phi B)2/\sin 2(X/2)\}$ wherein F represents an oblateness which is obtained from an equation of F=(A−B)/A, and the geodesic length ρ is obtained from an equation of $\rho=A \cdot (X+\Delta\rho)$.

The transmission power determination unit 308 determines the transmission power in accordance with the distance of one of the other vehicles that is located furthest from the host vehicle. Methods of calculating the transmission power include, for example, a method in which a relation between the distance and the transmission power is preliminarily measured by an experiment and its relational equation is obtained to determine the transmission power, and a method of obtaining the transmission power using the Friis formula of the following equation (1).

$$Pt=Pr/(GT \ast Gr) \ast (4\pi D/\lambda) \ast (4\pi D/\lambda) \qquad (1)$$

In the formula (1), Pr represents a minimum receivable reception power, D represents a distance between the host vehicle and one of the other vehicles, Gt represents an absolute gain of the transmission antenna, Gr represents an absolute gain of the reception antenna, and λ represents the inverse number of the frequency of a transmission radio wave. In addition, there is also a method in which while a confirmation packet is transmitted to one of the other vehicles that is located furthest from the host vehicle after the transmission power is minimized, the transmission power is gradually increased until the conformation packet is returned, and the transmission power is set when the returned packet arrives. In the case where the host vehicle is not located in a traffic line, the transmission power determination unit 308 transmits a defined transmission power to the transmission power controlling unit 305. Specifically, the transmission intensity is maintained in the ranges illustrated by the transmission ranges 100 and 101 in FIG. 1. The transmission power controlling unit 305 is set at the transmission power determined by the transmission power determination unit 308 when transmitting a transmission signal. The transmission/reception processing unit 316 transmits a transmission signal at the transmission power determined by the transmission power determination unit 308.

Figure 8:
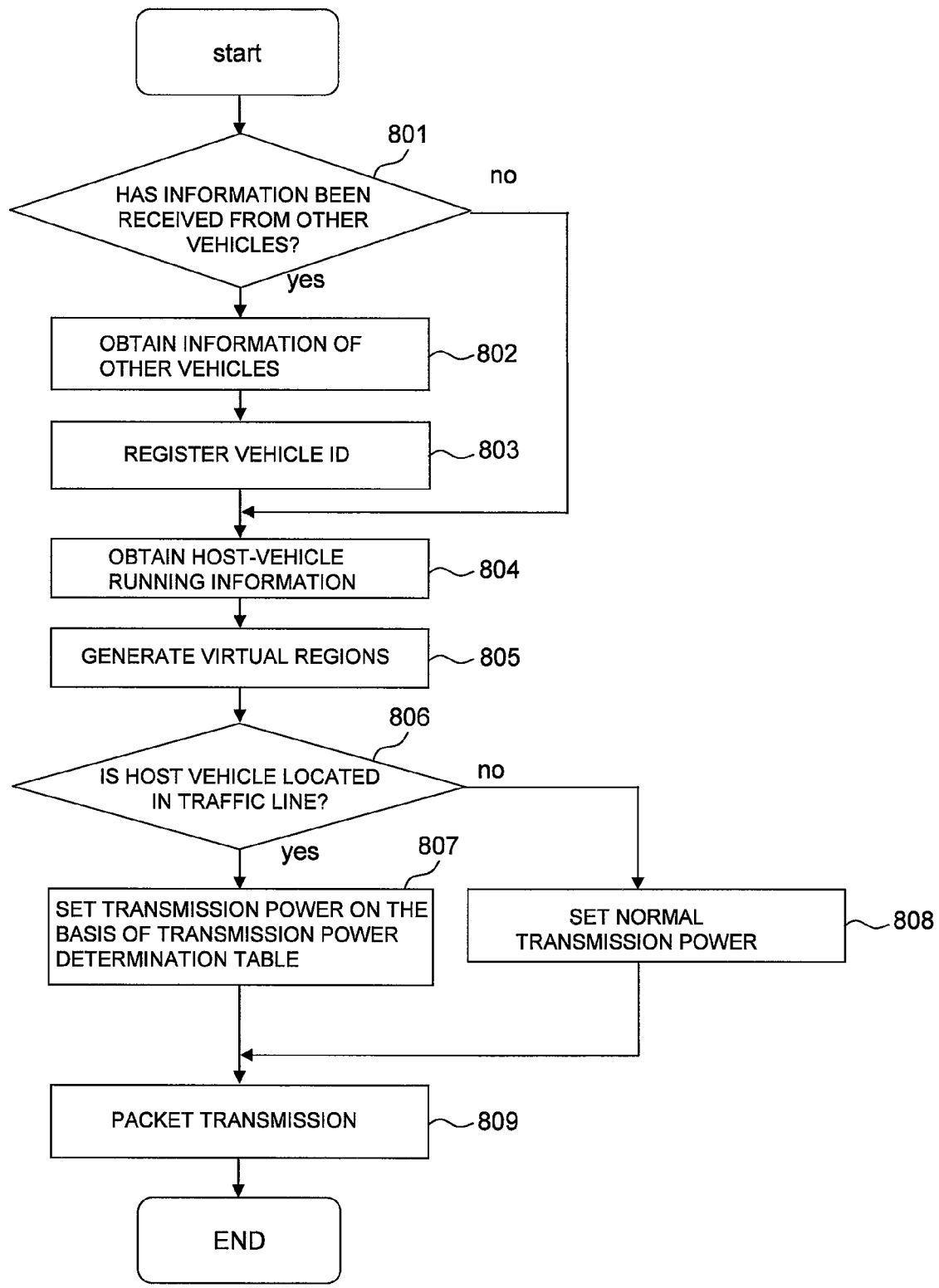
FIG. 8 is a data processing flow for showing operations performed by the vehicle communication system that is shown by the functional blocks of FIG. 4.

FIG. 8 illustrates a data processing flow performed by the vehicle communication system 200 that is shown by the functional blocks of FIG. 4. The transmission/reception unit 316 determines whether or not a packet transmitted from any one of the in-vehicle communication systems of the other vehicles has been received (801). If received, the other-vehicles running information reception processing unit 306 reads the vehicle running information included in the received packet (802). The vehicle running information DB updating unit 309 receives the vehicle running information extracted from the received packet by the other-vehicles running information reception processing unit 306, and registers the same into the vehicle database 310 while using the vehicle ID as an index (803). When performing the registration process into the vehicle database 310, or when the running information is not additionally received from the other vehicles, the host-vehicle running information generating unit 311 obtains the running information of the host vehicle to generate a host-vehicle running information packet (804). In addition, the virtual region defining unit 312 generates the virtual regions on the basis of the running information of the host vehicle and the like (805). Thereafter, the traffic line determination unit 307 checks whether or not there are located the other vehicles the number of which is larger than a threshold value in the virtual regions, and accordingly determines whether or not the host vehicle is located in a traffic line (806). If it is determined that the host vehicle is located in a traffic line, the transmission power determination unit 308 resets the transmission power at a low level within a range where the transmission signal can be reached to the host vehicle in the front and rear virtual regions and the other vehicles in the virtual regions of the host vehicle, and narrows the transmission range (807). For example, the transmission intensity is reduced, so that the relatively-large transmission ranges such as 100 and 101 of FIG. 1 are changed into the relatively-narrow transmission range such as 102 of FIG. 1. In the case where the host vehicle is not located in a traffic line, a normal transmission power is maintained, so that the relatively-large transmission ranges such as 100 and 101 of FIG. 1 can be maintained. The transmission/reception processing unit 316 transmits the transmission signal at the transmission power determined by the transmission power determination unit 308 (809).

According to the transmission power control in the vehicle communication system 200 described above, vehicle driving is supported by periodically transmitting and receiving the running information to/from the other vehicles while performing WAVE communications in compliant with IEEE802.11p in which a protocol such as CSMA/CA designed for wireless communication collision avoidance is used. Even when it is determined that a host vehicle enters in a traffic line and a plurality of other vehicles the number of which is larger than a threshold value are located in front and rear virtual regions of the host vehicle, a transmission power is reduced to the extent that communications between the host vehicle and one of the other vehicles that is located furthest in the virtual regions can be secured. Accordingly, even when the host vehicle enters in a traffic line and the number of the other vehicles around the host vehicle is increased, the transmission range is narrowed to decrease the number of vehicles entering into the range, so that it is possible to prevent occurrence of a situation that there are located vehicles the number of which is larger than the capacity of a network which enables wireless communication collision avoidance using a protocol such as CSMA/CA. In addition, even if the transmission power is reduced, the transmission power at which communications between the host vehicle and one of other vehicles that is located furthest in the virtual regions can be secured is maintained. Thus, there is no possibility that driving support for vehicles cannot be performed due to inability of communications with the other vehicles. The respective vehicles located in a traffic line control their communication intensities using the same protocol as described above, so that it is possible to provide a high-quality safe-driving support service for prevention of collision accident in traffic.

Further, if the velocity of the host vehicle is high, the virtual regions are enlarged to control the transmission power, and if the velocity of the host vehicle is low, the virtual regions are narrowed to control the transmission power. Accordingly, the present invention is suitable for providing a safe-driving support service for prevention of collision accident in traffic in consideration of the velocity of the vehicle.

The present invention achieved by the inventors has been concretely described above on the basis of the embodiment. However, it is obvious that the present invention is not limited to the embodiment, but can be variously changed in a range without departing from the gist of the present invention.

For example, the virtual regions are not limited to the divided two front and rear regions, but may be four front, rear, right, and left regions. Different threshold values of the number of vehicles may be set for the respective front, rear, right, and left regions to control the transmission power. The running information of the other vehicles may not be registered into the database. For example, the running information may be sequentially used after accumulating into a buffer memory such as a FIFO buffer. Further, the vehicles are not limited to automobiles, but may be rail cars or ships.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. A vehicle communication system comprising:
a host-vehicle information generating unit which generates running information of a host vehicle;
a communication processing unit which transmits the running information of the host vehicle generated by the host-vehicle information generating unit in wireless communications and receives running information of other vehicles in wireless communications;
a virtual region defining unit which defines virtual regions around the travelling direction of the host vehicle on the basis of the generated running information of the host vehicle;
a traffic line determination unit which determines whether or not there are located the other vehicles the number of which is larger than a threshold value in front and rear regions in the running direction of the host vehicle among the defined virtual regions, on the basis of the received running information of the other vehicles and the generated running information of the host vehicle; and
a transmission controlling unit which maintains a first transmission power when it is determined by the traffic line determination unit that the number of the other vehicles is smaller than the threshold value, and which controls to reduce the transmission power in wireless communications to a second transmission power lower than the first transmission power when it is determined by the traffic line determination unit that the number of the other vehicles is larger than the threshold value.

2. The vehicle communication system according to claim 1,
wherein the host-vehicle information generating unit inputs thereinto an output of a sensor, and generates the position of the host vehicle, the running velocity of the host vehicle, and the travelling direction of the host vehicle as the running information.

3. The vehicle communication system according to claim 1,
wherein the communication processing unit uses a communication protocol in accordance with carrier sense multiple access.

4. The vehicle communication system according to claim 1,
wherein the communication processing unit receives the IDs of the other vehicles, the positions of the other vehicles, the running velocities of the other vehicles, and the travelling directions of the other vehicles as the running information of the other vehicles.

5. The vehicle communication system according to claim 4, further comprising a database in which the running information of the other vehicles received by the communication processing unit is accumulated using the IDs of the other vehicles as indexes in a rewritable manner,
wherein the traffic line determination unit uses the running information of the other vehicles accumulated in the database.

6. The vehicle communication system according to claim 1,
wherein the virtual regions defined by the virtual region defining unit comprise a front region and a rear region which are divided at the position of the host vehicle.

7. The vehicle communication system according to claim 1,
wherein as the velocity of the host vehicle is increased, the virtual region defining unit defines the virtual regions larger.

8. The vehicle communication system according to claim 1,
wherein when it is determined by the traffic line determination unit that the number of the other vehicles is larger than the threshold value, the transmission controlling unit determines a transmission power on the basis of a distance of one of the other vehicles that is located furthest in the virtually-defined regions as a parameter.

9. The vehicle communication system according to claim 1,
wherein when it is determined by the traffic line determination unit that the number of the other vehicles is larger than the threshold value and when a confirmation packet is transmitted to one of the other vehicles that is located furthest from the host vehicle while gradually increasing the transmission power from the lowest level, and a reply for the transmission arrives, the transmission controlling unit sets the transmission power as the second transmission power.

10. A vehicle communication system comprising:
a host-vehicle information generating unit which generates running information of a host vehicle;
a communication processing unit which transmits the running information of the host vehicle generated by the host-vehicle information generating unit in wireless communications and receives running information of other vehicles in wireless communications;
a database in which the running information of the other vehicles received by the communication processing unit is accumulated;
a virtual region defining unit which defines virtual regions around the travelling direction of the host vehicle on the basis of the generated running information of the host vehicle;
a traffic line determination unit which determines whether or not there are located the other vehicles the number of which is larger than a threshold value in front and rear regions in the running direction of the host vehicle among the defined virtual regions, on the basis of the running information of the other vehicles accumulated in the database and the generated running information of the host vehicle; and
a transmission controlling unit which controls, when it is determined by the traffic line determination unit that the number of the other vehicles is larger than the threshold value, to narrow a transmission range in wireless communications as compared to a case that the number of the other vehicles is smaller than the threshold value.

* * * * *